(12) United States Patent
Blázquez-Sánchez

(10) Patent No.: US 11,554,447 B2
(45) Date of Patent: Jan. 17, 2023

(54) DEVICE FOR A LASER MACHINING SYSTEM, AND LASER MACHINING SYSTEM HAVING A DEVICE OF THIS KIND

(71) Applicant: PRECITEC GMBH & CO. KG, Gaggenau (DE)

(72) Inventor: David Blázquez-Sánchez, Gaggenau (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 0 days.

(21) Appl. No.: 17/416,579

(22) PCT Filed: Dec. 6, 2019

(86) PCT No.: PCT/EP2019/084018
§ 371 (c)(1),
(2) Date: Jun. 21, 2021

(87) PCT Pub. No.: WO2020/126557
PCT Pub. Date: Jun. 25, 2020

(65) Prior Publication Data
US 2022/0118554 A1    Apr. 21, 2022

(30) Foreign Application Priority Data
Dec. 20, 2018   (DE) .................. 102018133020.0

(51) Int. Cl.
*B23K 26/38* (2014.01)
*B23K 26/06* (2014.01)

(52) U.S. Cl.
CPC .......... *B23K 26/38* (2013.01); *B23K 26/0648* (2013.01)

(58) Field of Classification Search
CPC . B23K 26/038; B23K 26/0648; B23K 26/064
See application file for complete search history.

(56) References Cited

U.S. PATENT DOCUMENTS

| | | | |
|---|---|---|---|
| 5,948,172 A | 9/1999 | Neiheisel | |
| 2016/0089749 A1* | 3/2016 | Mori | G02B 27/40 219/121.75 |

FOREIGN PATENT DOCUMENTS

| | | |
|---|---|---|
| DE | 102011016932 A1 | 10/2012 |
| DE | 102012108214 A1 | 3/2014 |

OTHER PUBLICATIONS

International Search Report dated Mar. 2, 2020; International Application No. PCT/EP2019/084018.

\* cited by examiner

*Primary Examiner* — Brian W Jennison
(74) *Attorney, Agent, or Firm* — Dinsmore & Shohl LLP

(57) ABSTRACT

A device for a laser machining system includes a laser beam optics for a machining laser beam with an arrangement of optical elements arranged one after the other in a beam path of the machining laser beam. With respect to a direction of propagation of the machining laser beam, a first outermost optical element of the arrangement of optical elements consists of a material with a thermal conductivity coefficient $k_T$ of 2 W/(m·K) or more.

12 Claims, 3 Drawing Sheets

DEVICE FOR A LASER MACHINING SYSTEM, AND LASER MACHINING SYSTEM HAVING A DEVICE OF THIS KIND

CROSS-REFERENCE TO RELATED APPLICATIONS

This application is the U.S. National Stage of PCT/EP2019/084018 filed Dec. 6, 2019, which claims priority to Germany Application No. 102018133020.0, filed Dec. 20, 2018, the entire content of both are incorporated herein by reference in their entirety.

FIELD OF THE INVENTION

The present disclosure relates to a device for a laser machining system or a laser machining head, such as a cutting or welding head, and a laser machining system including such a device. In particular, the present disclosure relates to avoiding laser beam-induced damage to laser beam optics.

BACKGROUND OF THE INVENTION

In a device for material machining by means of laser, e.g. in a laser machining head for laser welding or laser cutting, the laser beam emerging from a laser light source or an end of a laser guide fiber is focused or collimated onto the workpiece to be machined by means of a beam guiding and focusing optics. Typically, a laser machining head with a collimator optics and a focusing optics is used, with the laser light being supplied via an optical fiber.

During laser material machining, there can be soiling in the laser machining head, such as soiling of beam shaping optics or imaging elements such as lenses or mirrors, reducing the quality and/or productivity of laser material machining. The causes of the soiling are varied. For example, smoke and sputtering of metals created during laser cutting or laser welding may cause soiling. In a further example, the laser machining head has to be opened in an industrial environment, for example in order to change an optical fiber of a fiber-coupled beam guiding system. The opening may cause dirt from the surroundings and/or abraded material to enter the head. Further examples of causes of soiling are condensation water when the cooling water temperature is below the dew point, contamination from the cutting gas or flushing gas and assembly or handling errors such as fingerprints on the optics.

Soiling reduces the quality of the laser process, e.g. a cutting quality, by changing the refractive power of the soiled optics. This is because soiling generally results in an absorption of laser energy at the corresponding point and thus in local heating, which in turn results in a change in refractive power. This may lead to what is known as a thermal focus shift. Local heating may even damage the optics, resulting in machine downtime and additional costs for repairs and spare parts.

Localized absorbing defects on optical components are weak points for high laser power optics because they lead to laser-induced damage. Since the soiling is located on the surface of the optical components, laser-induced damage will first be found on the surface or on the coating. As a rule, optical absorption processes couple thermal energy into the coating or into the optical component and cause a sharp rise in temperature until failure due to overheating occurs. In some cases this may cause the coating to melt, in other cases thermal expansion results in high mechanical stress and subsequent stripping of the coating or even to cracks in the optical components themselves.

SUMMARY OF THE INVENTION

It is an object of the present disclosure to provide a device for a laser machining system and a laser machining system including such a device, which can reduce or even prevent the negative effects of soiling of laser beam optics. In particular, it is an object of the present disclosure to provide a laser beam optics able to prevent machine downtime caused by soiling of the laser beam optics.

This object is achieved by the subject matter disclosed herein. Advantageous developments of the invention are also disclosed.

According to an independent aspect of the present disclosure, a device for a laser machining system, in particular for a laser machining head, is provided. The device comprises a laser beam optics for a laser beam, comprising an arrangement of optical elements arranged consecutively in a beam path of the laser beam. With regard to a direction of propagation of the laser beam, a first outermost optical element of the arrangement of optical elements consists of a material with a thermal conductivity coefficient $k_T$ of 2 W/(m·K) or more, or even 9 W/(m·K) or more. The first outermost optical element may be an optical element closing off the arrangement of the optical elements to the outside. The outermost optical element may also be referred to as the closing optical element.

In other words, a device for a laser machining system, in particular for a laser machining head, comprises an arrangement of optical elements for a laser beam optics, the optical elements being arranged one after the other or consecutively along an (optical) axis of the arrangement, wherein at least one closing optical element closes off the arrangement of optical elements in the direction of the (optical) axis of the arrangement and consists of a material with a thermal conductivity coefficient $k_T$ of 2 W/(m·K) or more. The optical elements of the arrangement may each have an optical axis which is coaxial with the optical axis of the arrangement. The (optical) axis of the arrangement may correspond to a beam axis of the laser beam in a state of the device in which it is inserted into a laser machining system or into a laser machining head.

According to the invention, at least one outermost or closing optical element, which closes off the arrangement to the outside and consists of a material with a high thermal conductivity coefficient, in particular with a higher thermal conductivity coefficient than quartz glass, is provided. If soiling is present on the surface of this element, laser-beam-induced local heating may occur at the location of the soiling. Due to the high thermal conductivity coefficient, the heat can be dissipated efficiently and quickly, thereby preventing damage induced by laser beams. This means that machine downtimes can be reduced and productivity can be increased.

In addition, the use of the material according to the invention with the high thermal conductivity not only enables passive cooling of the optical element, but also offers the possibility of efficient active cooling. For example, sapphire optics cooled by means of a water-cooled heat sink is significantly more efficient. Active water cooling may further reduce machine downtime compared to passively cooled optics.

The laser beam optics may include a laser beam input side through which a laser beam enters the laser beam optics and a laser beam output side through which the laser beam exits the laser beam optics. The first outermost or closing optical element is preferably arranged on the laser beam input side. For example, the optical elements of the arrangement may be arranged along a vertical axis, so that the first outermost optical element is a topmost optical element. Dirt particles that fall from top to bottom due to gravity may fall onto the outer surface of the first outermost optical element. Thanks to the high thermal conductivity coefficient, laser-induced damage can still be prevented.

Preferably, the arrangement of optical elements comprises a second outermost or closing optical element with respect to the direction of propagation of the machining laser beam. The second outermost optical element may be arranged on the laser beam output side. For example, the second outermost optical element may be a lowermost optical element of the arrangement. The first outermost optical element and the second outermost optical element may be arranged on opposite sides of the arrangement. In particular, the first outermost optical element and the second outermost optical element may form a termination of the arrangement or the device, such as a lens cartridge, for example.

Preferably, the arrangement of optical elements comprises at least one further optical element arranged between the first outermost optical element and the second outermost optical element. The arrangement may thus comprise a plurality of optical elements, wherein the optical element closing off the arrangement or the device at the top may consist of the material with the high thermal conductivity coefficient. The at least one further optical element and optionally the second outermost optical element may consist of materials with thermal conductivity coefficients that are less than the thermal conductivity coefficient of the first outermost optical element, respectively.

The second outermost optical element preferably also consists of a material with a thermal conductivity coefficient $k_T$ of 2 W/(m·K) or more, or even of 9 W/(m·K) or more. For example, the first outermost optical element and the second outermost optical element may consist of the same material. In particular, the elements closing off to the outside may have the high thermal conductivity coefficient. In another embodiment, the first outermost optical element and the second outermost optical element may consist of different materials.

The first outermost optical element and/or the second outermost optical element are preferably selected from the group consisting of a protective glass, a lens, a beam shaping optics, a beam splitter, a mirror, a transmissive optical element, a focusing lens and a collimator lens.

Preferably, the material of the first outermost optical element and/or the material of the second outermost optical element is selected from the group consisting of $Al_2O_3$ (sapphire), ZnS (zinc sulfide), ZnSe (zinc selenium), $CaF_2$ (calcium fluoride), crystal quartz and diamond. The material of the first outermost optical element and/or the material of the second outermost optical element is preferably sapphire.

The device is preferably a lens cartridge, in particular an exchangeable lens cartridge. The arrangement of optical elements is included in the lens cartridge. The first and/or second closing optical element may seal the lens cartridge in an airtight manner. One or more sealing elements may also be provided for this purpose. The lens cartridge may be removed from or inserted into the laser machining system, and in particular the laser machining head. The lens cartridge may, for example, be exchanged for different applications, thus providing a laser machining head with high flexibility.

The device preferably includes a coating, in particular an anti-reflective coating, on the first outermost optical element and/or the second outermost optical element. The anti-reflective coating may consist of $MgF_2$, for example. The material of the outermost optical element with the high thermal conductivity may, for example, form a substrate on which the anti-reflective coating is applied. The outermost optical element with the coating preferably has a lower coefficient of thermal expansion and/or a higher fracture toughness than without the coating. For example, the outermost optical element with the coating may have a coefficient of thermal expansion of $7.7*10^{-6}$ $K^{-1}$ or less.

According to a further aspect of the present disclosure, a laser machining system, and in particular a laser machining head such as a cutting or welding head, is provided. The laser machining system comprises a laser device for providing a laser beam, in particular a machining laser beam, and the device described in this document, which is inserted into the beam path of the laser beam. The beam path of the laser beam may be arranged coaxially with an optical axis of the device or with the optical axes of the optical elements included in the device. The laser beam optics is preferably arranged in the beam path of the laser beam in such a way that the optical elements of the arrangement are arranged one after the other in the vertical direction. Here, a laser beam input side of the laser beam optics may be arranged at the top and a laser beam output side of the laser beam optics may be arranged at the bottom

BRIEF DESCRIPTION OF THE DRAWINGS

Exemplary embodiments of the disclosure are shown in the figures and are described in more detail below. In the figures.

DETAILED DESCRIPTION OF THE INVENTION

Unless otherwise noted, the same reference symbols are used hereinafter for elements that are the same and have the same effect.

Figure 1:
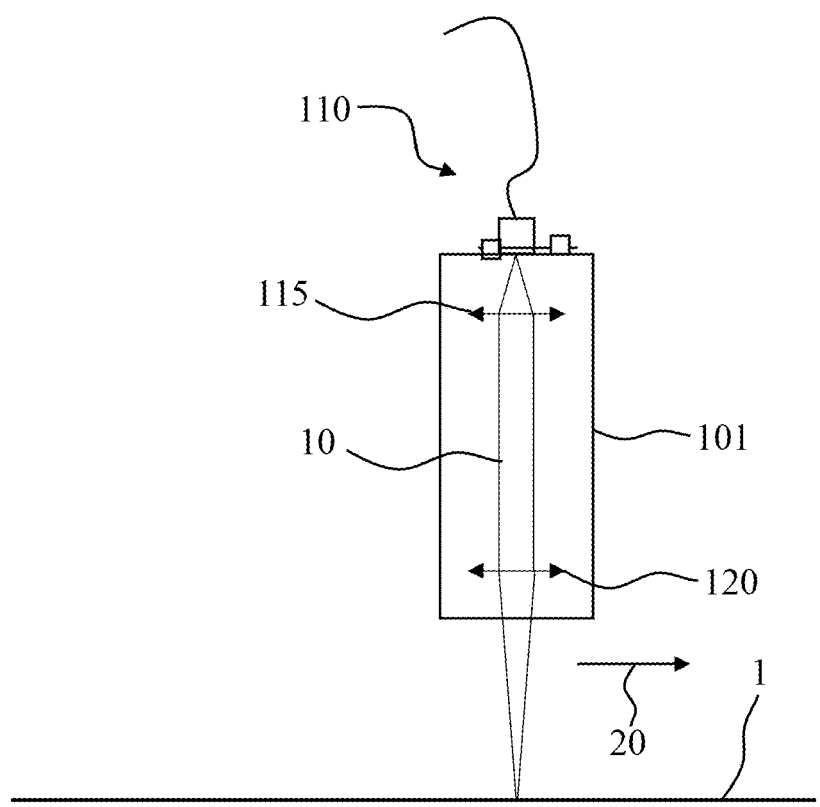
FIG. 1 shows a laser machining system according to embodiments of the present disclosure.

FIG. 1 shows a laser machining system 100 according to embodiments of the present disclosure.

The laser machining system 100 may comprise a machining head 101, such as a cutting head or welding head, or it may be such a machining head 101. According to embodiments, the laser machining system 100, or parts thereof such as the machining head 101, may be movable along a machining direction 20. The machining direction 20 may be a welding direction and/or a direction of movement of the laser machining system 100, such as the machining head 101, with respect to the workpiece 1. In particular, the machining direction 20 may be a horizontal direction. The machining direction 20 may also be referred to as the "feed direction".

The laser machining system 100 comprises a laser device 110 for providing a machining laser beam 10 (also referred to as a "machining beam" or "laser beam"). The laser device 110 may comprise an optical fiber or be an optical fiber via which the laser beam 10 is supplied into the machining head 101.

The laser machining system 100 includes a laser beam optics. The laser beam optics may, in particular, include a collimator optics 115, such as a collimator lens or a lens system with a plurality of lenses, for collimating the laser beam 10. The laser beam 10 may propagate from the laser device 110 via an optional optical device of the laser beam optics (not shown), which may be a protective glass in front of the collimator optics, a mirror, a lens or a diaphragm or a combination thereof, to the collimator optics 115.

In some embodiments, the laser beam optics comprises a focusing optics 120, such as a focus lens or a zoom system or a plurality of lenses, for focusing the laser beam 10 onto the workpiece 1. The collimator optics 115 and the focusing optics 120 may be integrated in the machining head 101.

The laser beam optics may comprise one or more exchangeable lens cartridges or optical elements permanently integrated into the machining head 101. For example, the machining head 101 may comprise an optics module, for example a collimator, zoom or focusing module, which is integrated into the machining head 101 or mounted on the machining head 101. The collimator and focusing modules may be provided as exchangeable lens cartridges, for example.

The laser beam optics comprises (or is) the arrangement of optical elements according to the invention, in which at least one outermost or outwardly closing optical element consists of a material with a higher thermal conductivity $k_T$ than the quartz glass usually used for optics that has a thermal conductivity coefficient $k_T$ of 1.5 W/(m·K) or more.

The material of the closing optical element may be, for example, $Al_2O_3$ (sapphire), ZnS (zinc sulfide), ZnSe (zinc selenium), $CaF_2$ (calcium fluoride), crystal quartz or diamond. For example, $Al_2O_3$ has a thermal conductivity coefficient $k_T$ of approx. 46 W/(m·K). ZnS has a thermal conductivity coefficient $k_T$ of approx. 27 W/(m·K). ZnSe has a thermal conductivity coefficient $k_T$ of approx. 16 W/(m·K). $CaF_2$ has a thermal conductivity coefficient $k_T$ of approx. 9.71 W/(m·K). Diamond has a thermal conductivity coefficient $k_T$ of approx. 2200 W/(m·K). With such high thermal conductivity coefficients, the heat introduced by the machining laser beam 10 at surface locations with soiling can be dissipated efficiently and quickly, as a result of which laser beam-induced damage can be prevented. This means that machine downtimes can be reduced and productivity can be increased.

Preferably sapphire is used for the closing optical element. The thermal conductivity of sapphire is approx. 30 times higher than that of the conventionally used quartz glass, so that a temperature rise caused by soiling is approx. 30 times lower.

In some embodiments, which may be combined with the other embodiments described in this document, the device comprises a coating on the closing optical element. The material of the coating is preferably adapted to the material of the closing optical element in such a way that a coefficient of thermal expansion is reduced or a fracture toughness is increased. For example, the coating may be a dielectric coating or an anti-reflective coating. The coating may consist of $MgF_2$ (magnesium fluoride), for example. The material of the optical element may, for example, form a substrate on which the coating is applied as a layer or film.

Typically, a coefficient of thermal expansion of the anti-reflective coating is adapted to a coefficient of thermal expansion of the material of the optical element with the high thermal conductivity. For example, the material of the anti-reflective coating is hosen such that temperature differences typically occurring during laser machining do not lead to any stripping of the anti-reflective coating off the optical element. In other words, the mechanical stress caused by temperature differences may be small enough to prevent the anti-reflective coating from being damaged or stripped off.

The closing optical element may be an optical element that has a high risk of soiling and preferably does not have to be exchanged often, i.e. is not a wear part. The closing optical element may be the optical element arranged closest to the laser device 110. The closing optical element may be arranged substantially horizontally in the machining head 101. The closing optical element may be arranged in a region in the machining head 101 in which the laser beam propagates essentially vertically. For example, the closing optical element may be arranged at the top in the laser beam optics. In other words, the closing optical element may be arranged ahead of other optical elements of the laser beam optics in the laser beam path.

Preferably, the at least one closing optical element with the high thermal conductivity is selected from the group consisting of a protective glass, a mirror, a beam splitter, a beam shaping optics, a lens, a transmissive optical element, a focusing lens and a collimator lens. The arrangement of at least some of the optical elements of the laser beam optics may, for example, be included in an exchangeable lens cartridge. In particular, at least one closing optical element may be arranged in the lens cartridge in such a way that it seals the lens cartridge towards the outside. For this, the closing optical element with the high thermal conductivity is preferably arranged at an end of the lens cartridge that faces the laser device 110. The laser machining system may include a plurality of lens cartridges, e.g., one each for collimating and/or focusing. At least one lens cartridge of the plurality of lens cartridges may comprise the closing optical element according to the invention. Since the material with high thermal conductivity, such as sapphire, may have higher manufacturing or material costs or worse optical or mechanical properties than conventional materials for optical elements such as quartz glass, the material with high thermal conductivity is used for optical elements at certain positions of the laser optics according to the invention.

In the following FIGS. 2 to 4, various examples of an arrangement of optical elements according to the invention are shown. The exemplary arrangements each have at least one closing optical element which, compared to the other optical elements, has a higher thermal conductivity. In the following figures, optical elements made of material with high thermal conductivity are shown shaded.

Figure 2:
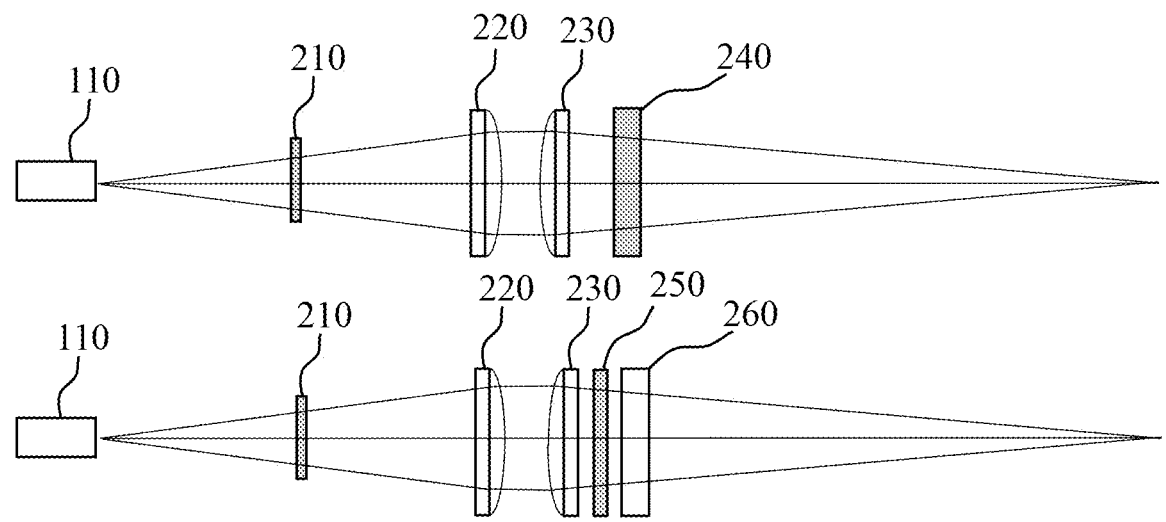
FIG. 2 shows an arrangement of optical elements according to embodiments of the present disclosure.

In FIG. 2, two lens groups are shown, namely a collimator optics 220 and a focusing optics 230. The collimator optics 220 may be, for example, a collimator lens or a collimator lens arrangement. The focusing optics 230 may be, for example, a focusing lens or a focusing lens arrangement. In addition, two or more protective glasses are provided.

In the upper illustration of FIG. 2, there is a first protective glass 210 in front of the collimator optics 220 and a second protective glass 240 after the focusing optics 230. The terms "in front of" and "after" relate to a direction of propagation of the machining laser beam. The protective glass 210 in front of the collimator optics 220 protects the collimation from soiling that may be caused, for example, when the laser device 110 is changed, for example when a fiber is inserted. The protective glass 240 after the focusing optics 230 protects the focusing, for example, from smoke and spatter from the laser process.

The first protective glass 210 and the second protective glass 240 form the outermost or closing optical elements of the upper arrangement in FIG. 2 and at least the protective glass 210 arranged closest to the laser device 110 consists of the material with high thermal conductivity, such as sapphire. For example, the first protective glass 210 and/or the second protective glass 240 may be arranged or inserted on an outside of the laser machining head. In some embodiments, the first protective glass 210 and/or the second protective glass 240 may seal the laser machining head in a substantially airtight manner.

In the lower illustration of FIG. 2, in addition to the first protective glass 210 in front of the collimator optics 220, there are at least two second protective glasses 250, 260 after the focusing optics 230. At least one second protective glass of the at least two second protective glasses 250, 260 consists of the material with high thermal conductivity, such as sapphire. The inner protective glass 250 arranged between the focusing optics 230 and the protective glass 260 closing off to the outside is preferably made of the material with high thermal conductivity, as shown in the lower part of FIG. 2. The second glass 260 may consist of a material with lower thermal conductivity than that of the material of the first glass 250. In particular, the second glass may consist of quartz glass. The second protective glass 260 closing off to the outside may be a wear part that protects against soiling when the laser process is carried out.

Figure 3:
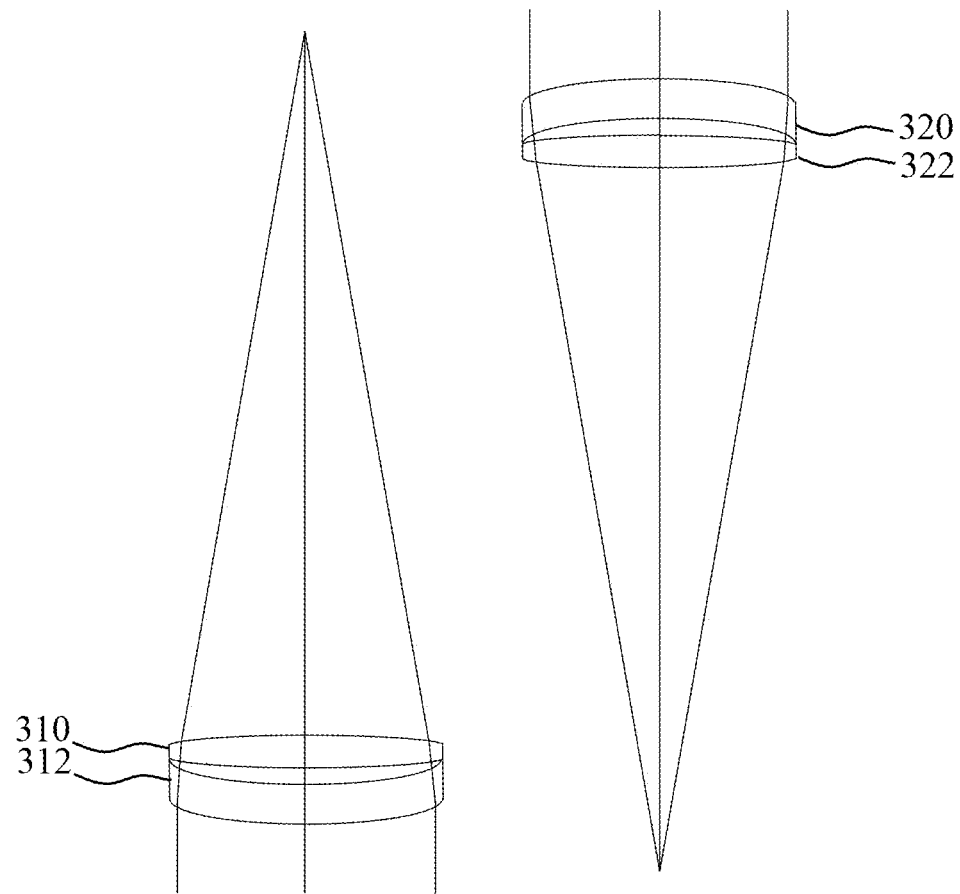
FIG. 3 shows an arrangement of optical elements according to further embodiments of the present disclosure.

FIG. 3 shows an arrangement of optical elements according to further embodiments of the present disclosure. As a rule, dirt particles fall in the direction of gravity from top to bottom. Therefore, for reasons of economy, alternatively only the optical element arranged at the top in the beam path, that is, next to the laser device 110, may consist of material with high thermal conductivity. Preferably, the lens cartridge is sealed by means of closing optical elements and sealing elements. Sealing elements may also be provided within the lens cartridge between the individual optical elements.

On the left in FIG. 3, a lens cartridge with the collimator optics is shown. On the right in FIG. 3, a lens cartridge with the focusing optics is shown. The direction of propagation of the laser beam 10 is from top to bottom in both representations of FIG. 3. The lens cartridges may be independent of one another and in particular may be exchangeable independently of one another. Each of the lens cartridges comprises a respective arrangement with an optical element that is arranged on a side of the lens cartridge facing the laser device 110 and consists of the material with the high thermal conductivity. Of course, this concept may be applied to any type of optical element, e.g. to beam shaping optics, mirrors, beam splitters, lens groups or zoom optics.

In the left illustration of FIG. 3, the collimator optics in the lens cartridge consists of a lens group with a first collimator lens 310 and a second collimator lens 312. The first collimator lens 310, which may be an upper lens with respect to the vertical, is made of the material with the high thermal conductivity, such as sapphire. The first collimator lens 310 may seal the lens cartridge towards the outside in a substantially airtight manner, for example using a sealant such as a sealing ring.

The second collimator lens 312, which may be a lower lens with respect to the vertical, may in some embodiments also be made of a material with high thermal conductivity, such as sapphire. In particular, the first collimator lens 310 and the second collimator lens 312 may consist of the same material. Alternatively, the first collimator lens 310 and the second collimator lens 312 may be made of different materials. For example, the second collimator lens 312 may be made of a material with a thermal conductivity that is less than the thermal conductivity of the first collimator lens 310. In particular, the second collimator lens 312 may consist of quartz glass. The second collimator lens 312 may seal the lens cartridge towards the outside in a substantially airtight manner, for example using a sealant such as a sealing ring.

The lens cartridge shown on the right in FIG. 3 includes a focusing optics consisting of a lens group with a first focusing lens 320 and a second focusing lens 322. The first focusing lens 320, which may be an upper lens with respect to the vertical, is made of the material with high thermal conductivity, such as sapphire. The first focusing lens 320 may seal the lens cartridge towards the outside in a substantially airtight manner, for example using a sealant such as a sealing ring.

The second focusing lens 322, which may be a lower lens with respect to the vertical, may in some embodiments also be made of a material with high thermal conductivity, such as sapphire. In particular, the first focusing lens 320 and the second focusing lens 322 may consist of the same material. Alternatively, the first focusing lens 320 and the second focusing lens 322 may be made of different materials. For example, the second focusing lens 322 may be made of a material with a thermal conductivity that is less than the thermal conductivity of the first focusing lens 320. In particular, the second focusing lens 322 may consist of quartz glass. The second focusing lens 322 may seal the lens cartridge towards the outside in a substantially airtight manner, for example using a sealant such as a sealing ring.

Figure 4:
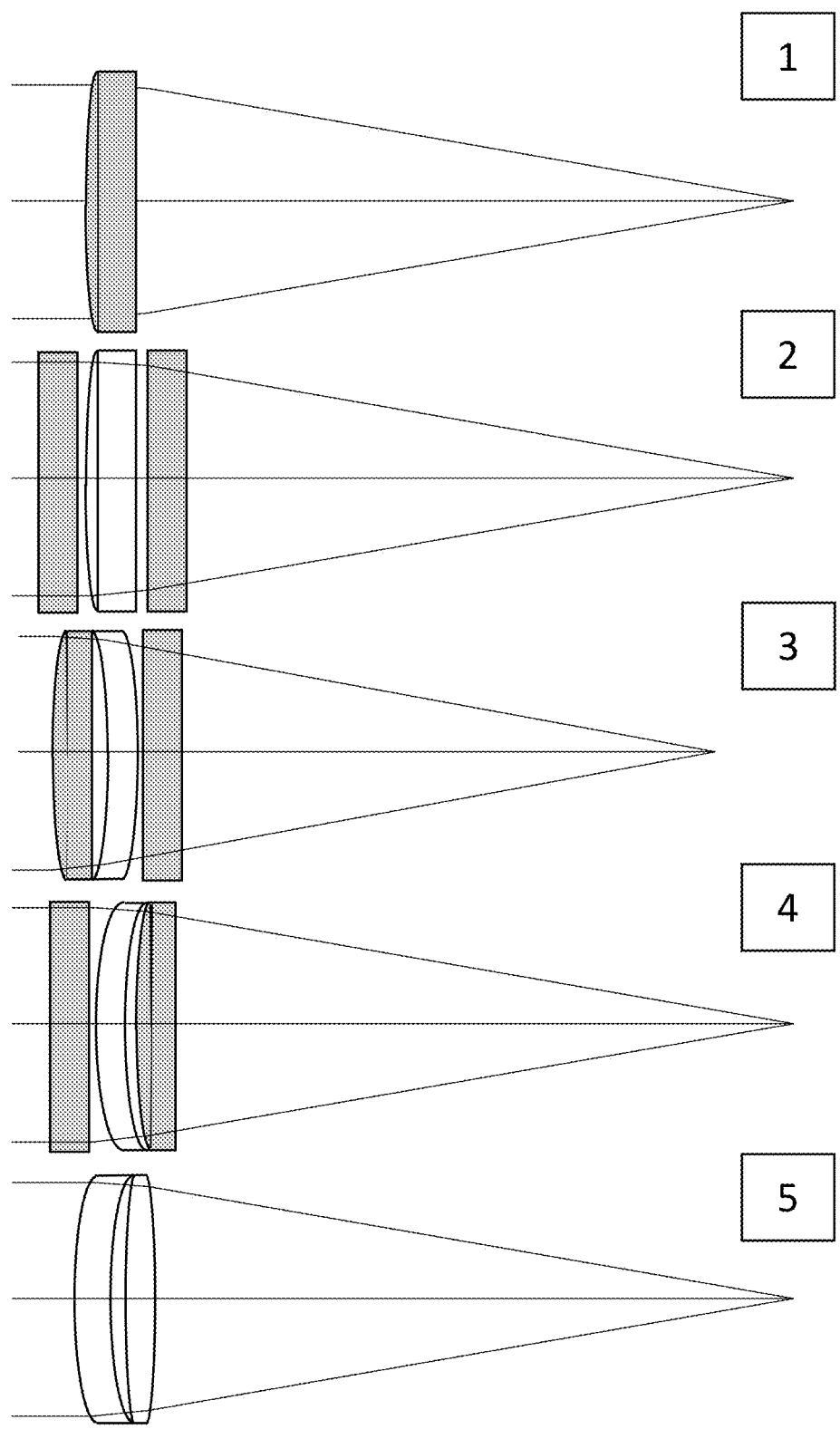
FIG. 4 shows an arrangement of optical elements according to still further embodiments of the present disclosure.

FIG. 4 shows an arrangement of optical elements according to still further embodiments of the present disclosure. FIG. 4 shows examples wherein at least one outermost or closing optical element consists of the material with high thermal conductivity (e.g. sapphire) and is arranged on the input side of the laser beam, i.e. on a side facing the laser device 110. The concepts shown in FIG. 4 may in particular be used for machining heads with exchangeable lens cartridges, which are at a greater risk of soiling. A material with high thermal conductivity, such as sapphire, is preferably used for the optical elements closing off the lens cartridge to the outside.

Example "1" shows a single lens made of sapphire. The single lens may be, for example, a collimator lens or a focusing lens.

Example "2" shows a single lens with two protective glasses. The single lens is arranged between the two protective glasses. At least the one protective glass that faces the laser device 110, i.e. is arranged on the laser beam input side, consists of the material with high thermal conductivity, such as sapphire. Preferably, both protective glasses consist of the material with high thermal conductivity. The individual lens may consist of a material with a thermal conductivity that is less than the thermal conductivity of the protective glasses. The single lens may consist of quartz, for example. The arrangement shown in example "2" in FIG. 4 may be implemented as a lens cartridge.

Example "3" shows a lens system consisting of two lenses with an air gap and a protective glass. The protective glass is arranged on the laser beam output side. The protective glass may face a focal point of the laser beam, for example. In other words, the protective glass may be arranged on the beam output side or on the side facing away from the laser device 110. The lens system, which may be a focusing lens system, comprises a first lens and a second lens, the second lens being arranged between the first lens and the protective glass. The outermost optical elements, i.e. the first lens and the protective glass, may consist of the material with high thermal conductivity, such as sapphire. However, at least the optical element arranged on the input side of the laser beam, i.e. the first lens, consists of the material with high thermal conductivity. The second lens may be made of quartz, for example. The arrangement shown in example "3" of FIG. 4 may be implemented as a lens cartridge.

Example "4" is similar to example "3", wherein the protective glass is arranged on the laser beam input side and is made of the material with high thermal conductivity. The protective glass may face a collimator lens, for example. The arrangement shown in example "4" in FIG. 4 may be implemented as a lens cartridge.

Example "5" shows a lens system consisting of two lenses with an air gap. The lens system may be a focusing lens system. Both lenses may consist of the material with high thermal conductivity, such as sapphire. At least the lens facing the laser device 110 consists of the material with high thermal conductivity. The arrangement shown in example "5" in FIG. 4 may be implemented as a lens cartridge.

The above-mentioned embodiments may prevent laser beam-induced damage to the optics due to soiling. However, the embodiments are not only advantageous with regard to laser beam-induced damage, but can also be used to compensate for a change in the refractive power of the soiled optics.

In particular, the embodiments of the present disclosure can be used to minimize a focus shift due to the effect of a thermal lens, as will be explained below. One reason for the so-called thermal lens is a change in the refractive index as a function of temperature. A temperature gradient due to laser absorption of soiling therefore leads to a change in the refractive index and thus to a focus shift. One way of minimizing the focus shift is passive compensation. For this purpose, at least two materials are used, namely a material with a positive refractive index change or positive focus shift and a material with a negative refractive index change or negative focus shift.

Some materials such as quartz glass or sapphire lead to an increase in the refractive index when the temperature rises, i.e. the refractive index change is positive. A material for which an increase in temperature leads to a lower refractive index is calcium fluoride, and it can be used, for example, for passive compensation of the focus shift. Since calcium fluoride has a high coefficient of thermal expansion and a low fracture toughness and is therefore very sensitive to soiling, calcium fluoride is preferably used for a further optical element of the laser optics, which is arranged after the optical element made of material with high thermal conductivity (sapphire) with respect to the direction of laser beam propagation.

With reference to examples "2" to "4" in FIG. 4, an optical element made of $CaF_2$ is arranged between the first closing optical element and the second closing optical element (sandwich concept) according to the invention. Here, the materials of the individual optical elements may be chosen such that the focus shift is passively compensated for. In particular, a first and a second closing optical element made of a material with a positive refractive index gradient and in between a further optical element made of a material with a negative refractive index gradient may be provided. The refractive index gradients may substantially cancel each other out. The first and the second closing optical element may consist of quartz or sapphire, for example, and the further optical element sandwiched in between may consist of calcium fluoride. If the first and second closing optical elements seal the lens cartridge in an airtight manner, at least one further optical element sensitive to soiling, for example an optical element made of calcium fluoride, may be inserted in the lens cartridge in between without increasing the risk of machine downtime due to soiling.

According to further embodiments of the present disclosure, a device for active cooling of the at least one closing optical element made of the material with high thermal conductivity is provided. A preferred example of a material with high thermal conductivity is sapphire. Due to its high thermal conductivity, sapphire enables active cooling of the corresponding optical element, which is significantly more efficient than for an optical element made of quartz glass. An example of a device for active cooling is a water-cooled heat sink.

According to the invention, at least one optical element which closes off the arrangement to the outside and is made of a material with a high thermal conductivity coefficient is provided. If soiling is present on the surface of this element, local heating induced by the laser beam may occur at the location of the soiling. Due to the high thermal conductivity coefficient, the heat can be dissipated efficiently and quickly, thereby preventing laser beam-induced damage. Machine downtimes can thus be reduced and productivity can be increased. The closing optical element may also have a coating. A combination of the materials for the coating and for the closing optical element itself may be adapted to one another in such a way that the coated optical element has a reduced coefficient of thermal expansion and/or a higher fracture toughness than the optical element without the coating.

The invention claimed is:

1. A device for a laser machining system, comprising:
a laser beam optics with an arrangement of optical elements comprising a collimator optics and a focusing optics, wherein the optical elements are arranged one after the other on an axis of the arrangement;
wherein a first closing optical element closes off the arrangement of optical elements in a direction of the axis on a laser beam input side of the laser beam optics and consists of a material with a thermal conductivity coefficient $k_T$ of 2 W/(m·K) or more,
wherein a second closing optical element closes off the arrangement of optical elements on the laser beam output side and is a protective glass made of quartz glass; and
wherein the arrangement of optical elements further comprises an inner protective glass consisting of a material with a higher thermal conductivity coefficient $k_T$ than quartz glass between the focusing optics and the second closing optical element.

2. The device according to claim 1, wherein the arrangement of optical elements comprises at least one further optical element disposed between the first closing optical element and the second closing optical element.

3. The device according to claim 2, wherein the further optical element between the first closing optical element and the second closing optical element consists of calcium fluoride or contains calcium fluoride.

4. The device according to claim 1, wherein the first closing optical element consists of a material with a higher thermal conductivity coefficient than quartz glass.

5. The device according to claim 1, wherein the material of the first closing optical element is selected from the group consisting of sapphire, zinc sulfide, zinc selenium, calcium fluoride, crystal quartz, and diamond.

6. The device according to claim 1, wherein a coating is provided on the first closing optical element and/or the second closing optical element.

7. The device of claim 6, wherein the closing optical element with the coating has a lower coefficient of thermal expansion and/or higher fracture toughness than without the coating, and/or wherein the coating is an anti-reflective coating made of $MgF_2$.

8. The device according to claim 1, wherein the first closing optical element is selected from the group consisting of a protective glass, a beam shaping optics, a beam splitter, a mirror, a lens, a transmissive optical element, a focusing lens, and a collimator lens.

9. The device according to claim 1, wherein the device is an exchangeable lens cartridge in which the arrangement of optical elements is included.

10. The device according to claim 9, wherein the first closing optical element and/or the second closing optical element seals the lens cartridge in a substantially airtight manner.

11. A laser machining system, comprising:
a laser device for providing a laser beam; and
the device according to claim 1 which is inserted in a beam path of the laser beam.

12. The laser machining system according to claim 11, wherein the optical elements of the laser beam optics are arranged along a direction of propagation of the laser beam in a vertical direction.

* * * * *